United States Patent
Okada

(10) Patent No.: US 9,110,429 B2
(45) Date of Patent: Aug. 18, 2015

(54) IMAGE FORMING APPARATUS

(71) Applicant: KYOCERA Document Solutions Inc., Osaka (JP)

(72) Inventor: Masanori Okada, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 14/508,298

(22) Filed: Oct. 7, 2014

(65) Prior Publication Data

US 2015/0104206 A1    Apr. 16, 2015

(30) Foreign Application Priority Data

Oct. 15, 2013   (JP) .................................. 2013-214882

(51) Int. Cl.
*G01K 7/42* (2006.01)
*G03G 15/00* (2006.01)

(52) U.S. Cl.
CPC *G03G 15/80* (2013.01); *G01K 7/42* (2013.01); *G01K 7/427* (2013.01); *G03G 15/5045* (2013.01)

(58) Field of Classification Search
CPC ..... G03G 15/5045; G03G 15/80; G01K 7/42; G01K 7/427
See application file for complete search history.

(56) References Cited

U.S. PATENT DOCUMENTS

2010/0023295 A1* 1/2010 Gross et al. .................... 702/130
2012/0099137 A1   4/2012 Kurose et al.

FOREIGN PATENT DOCUMENTS

JP    09-211963    8/1997

* cited by examiner

*Primary Examiner* — G. M. Hyder
(74) *Attorney, Agent, or Firm* — Wenderoth, Lind & Ponack, L.L.P.

(57) ABSTRACT

A controller determines a mode at a current time point, and corrects, on the basis of the determined mode and an elapsed time from a start time of the mode clocked by a timer to a current time point, an in-apparatus temperature detected by an in-apparatus temperature sensor on the basis of correction data so that the corrected temperature is calculated as an outside-air temperature.

4 Claims, 5 Drawing Sheets

IMAGE FORMING APPARATUS

CROSS-REFERENCE TO RELATED APPLICATION

This application is based upon and claims the benefit of priority from Japanese Patent Application No. 2013-214882 filed on Oct. 15, 2013, the entire contents of which are incorporated herein by reference.

BACKGROUND

The technology of the present disclosure relates to an image forming apparatus.

Conventionally, there is known an image forming apparatus provided with an in-apparatus temperature sensor that detects an in-apparatus temperature and an outside-air-temperature calculation unit that calculates an outside-air temperature (outside-air temperature) on the basis of the in-apparatus temperature detected by the in-apparatus temperature sensor. It is proposed in this image forming apparatus that when a main power source is applied, an OFF time of the main power source is determined on the basis of an output signals from the in-apparatus temperature sensor and a fixing temperature sensor, and only when it is determined that the OFF time is longer than a predetermined time, a process for calculating the outside-air temperature is executed by the outside-air-temperature calculation unit.

In the image forming apparatus, there are only two states, that is, an OFF state of the main power source and an ON state thereof. In the meantime, however, in a recently developing image forming apparatus of energy saving type, in the ON state of the main power source, there are two modes, that is, a normal mode and a sleep mode in which the power is less consumed than in the normal mode.

SUMMARY

An image forming apparatus according to one aspect of the present disclosure includes an apparatus body, an in-apparatus temperature sensor, and an outside-air-temperature calculation unit. The apparatus body includes an image forming unit that forms an image on a recording paper. The in-apparatus temperature sensor detects an in-apparatus temperature that is a temperature inside the apparatus body. The outside-air-temperature calculation unit calculates an outside-air temperature that is a temperature outside the apparatus body on the basis of the in-apparatus temperature detected by the in-apparatus temperature sensor. The image forming apparatus is configured to switch its operation mode between a normal mode and a sleep mode in which the power is less consumed than in the normal mode.

The image forming apparatus further includes a storage unit, a mode determination unit, and a clocking unit. The storage unit stores therein data on a difference between the in-apparatus temperature detected by the in-apparatus temperature sensor and the outside-air temperature. The mode determination unit determines whether a mode at a current time point is either the normal mode or the sleep mode. The clocking unit clocks or estimates an elapsed time from a start time of the mode determined by the mode determination unit to a current time point. The outside-air-temperature calculation unit corrects, on the basis of the mode at a current time point determined by the mode determination unit and the elapsed time from a start time of the mode clocked by the clocking unit to a current time point, the in-apparatus temperature detected by the in-apparatus temperature sensor on the basis of the data so that the corrected temperature is calculated as the outside-air temperature.

DETAILED DESCRIPTION

First Embodiment

Figure 1:
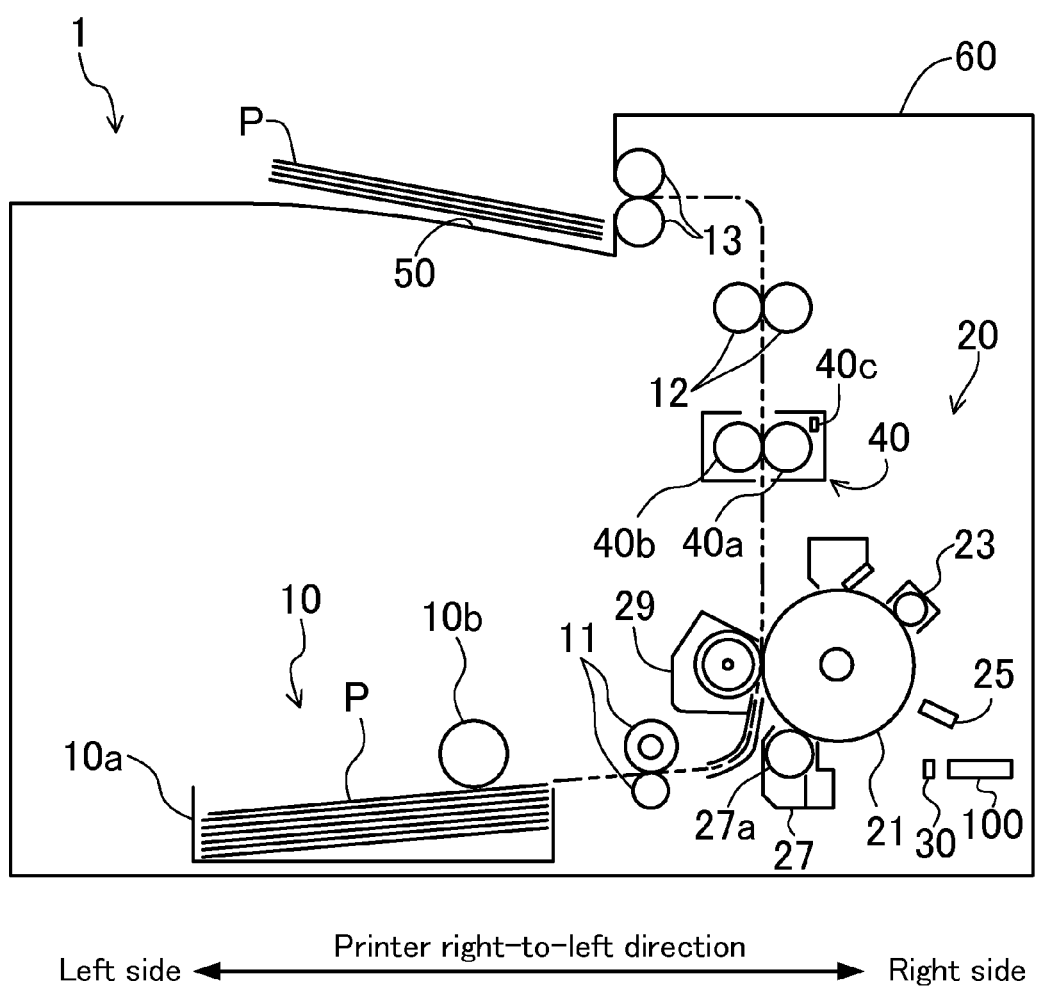
FIG. 1 is a schematic cross-sectional view showing a laser printer as an image forming apparatus in an embodiment.

FIG. 1 shows a laser printer 1 (hereinafter, briefly referred to as "printer"), as an image forming apparatus in the present embodiment. The printer 1 includes an apparatus body 60 having an image forming unit 20. A paper feed unit 10 is arranged at a lower part inside the apparatus body 60, and a paper discharge unit 50 is formed on an upper surface of the apparatus body 60. Along a paper conveyance path from the paper feed unit 10 to the paper discharge unit 50, a plurality of pairs of conveyance rollers 11 to 13 that hold and convey a paper P are disposed.

The paper feed unit 10 includes a paper feed cassette 10a in which the sheet-like paper P is housed, and a pick-up roller 10b that picks up the paper P in the paper feed cassette 10a and sends out the extracted paper P outside the cassette. The paper P sent out outside the cassette from the paper feed cassette 10a is supplied via the conveyance roller pair 11 to the image forming unit 20.

The image forming unit 20 includes a photoreceptor drum 21, as an image carrier, a charger 23, an exposure device 25, a developing device 27, a transfer device 29, and a fixing device 40. The image forming unit 20 charges a circumferential surface of the photoreceptor drum 21 by the charger 23, and irradiates the surface of the photoreceptor drum 21 by the exposure device 25 with laser light based on original document image data (for example, image data of an original document image received from an external terminal). Thus, an electrostatic latent image corresponding to the image data is formed on the surface of the photoreceptor drum 21. The electrostatic latent image formed on the surface of the photoreceptor drum 21 is developed, as a toner image, by the developing device 27. Thus, a toner image is formed (carried) on the surface of the photoreceptor drum 21. Then, the image forming unit 20 transfers the toner image by the transfer device 29 to the paper P supplied from the paper feed unit 10, and supplies the transferred paper P to the fixing device 40.

In the fixing device 40, the paper P supplied from the transfer device 29 is heated and pressurized between a fixing roller 40a and a pressure roller 40b, and the toner image is thereby fixed onto the paper P. Then, the paper P onto which the toner image is fixed by the fixing device 40 is conveyed, by the both rollers 40a and 40b, to a downstream side in a paper conveyance direction. The paper P conveyed from the fixing device 40 is discharged via the plurality of pairs of conveyance rollers 12 and 13 to the paper discharge unit 50.

The printer 1 includes a fixing temperature sensor 40c and an in-apparatus temperature sensor 30. The fixing temperature sensor 40c is a sensor capable of measuring a temperature of an object to be measured in a non-contact manner. The fixing temperature sensor 40c is disposed near the fixing roller 40a to measure a temperature of the fixing roller 40a. The fixing temperature sensor 40c detects a temperature of the fixing roller 40a and transmits the detection signal to a controller 100 (see FIG. 3).

The in-apparatus temperature sensor 30 is disposed below the exposure device 25 inside the apparatus body 60. The in-apparatus temperature sensor 30 is configured by a thermistor, for example. The in-apparatus temperature sensor 30 detects a temperature inside the apparatus body 60 and outputs the detection signal to the controller 100.

The controller 100 (see FIG. 3) is configured by a microcomputer having a CPU, a ROM, and a RAM, etc. The controller 100 is disposed near the in-apparatus temperature sensor 30. The controller 100 includes a timer 100a as a clocking unit. The controller 100 functions as an outside-air-temperature calculation unit, a mode determination unit, and a clocking unit.

The controller 100 selectively switches the operation mode of the printer 1 between a normal mode and a sleep mode in which the power is consumed less than in the normal mode. In the normal mode, power is supplied to devices configuring the image forming unit 20 and to an operation portion (not shown) such as a touch panel. On the other hand, in the sleep mode, the power is not supplied to the devices configuring the image forming unit 20 and the power is supplied only to a part of the devices such as the operation portion. When the controller 100 detects that the main power source of the printer 1 is turned on, the operation mode of the printer 1 is switched to the normal mode. After the controller 100 switches the operation mode of the printer 1 to the normal mode, if, continuously for a predetermined period (for example, 30 minutes), an operation signal from the operation portion by a user is not detected or original document image data is not received from an external terminal, then the controller 100 switches the operation mode of the printer 1 from the normal mode to the sleep mode.

Figure 2:
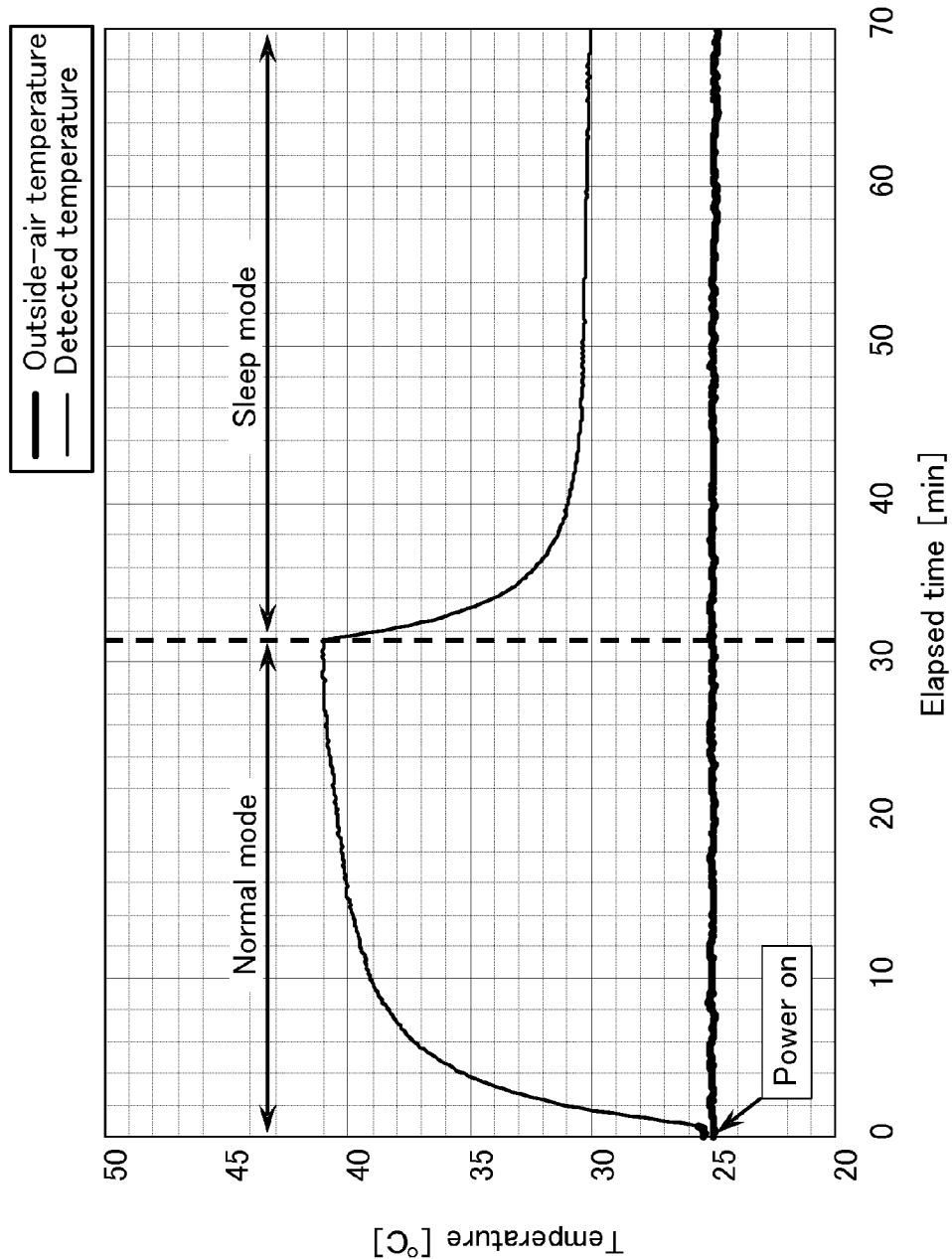
FIG. 2 is a graph showing a temperature detected by an in-apparatus temperature sensor and a calculation result of an outside-air temperature.

FIG. 2 is a graph showing a measurement result of a temperature detected by the in-apparatus temperature sensor 30. A thin line on the graph indicates the detected temperature and a bold line indicates an outside-air temperature. Firstly, when the main power source is turned on so that the operation mode of the printer 1 is switched to the normal mode, a temperature detected by the in-apparatus temperature sensor 30 rapidly rises due to heat generated by a CPU in the controller 100, for example. When about 10 minutes lapses from a start time of the normal mode, the degree of rise becomes gradual and when about 30 minutes lapses, the temperature detected by the in-apparatus temperature sensor 30 becomes substantially constant. Thereafter, when the operation mode of the printer 1 is switched to the sleep mode, the temperature detected by the in-apparatus temperature sensor 30 rapidly falls because the amount of heat to be generated by the CPU in the controller 100 decreases. Then, when about 10 minutes lapses from a start time of the sleep mode, the degree of fall becomes gradual, and when about 20 minutes lapses from the start time, the temperature detected by the in-apparatus temperature sensor 30 becomes substantially constant.

Figure 3:
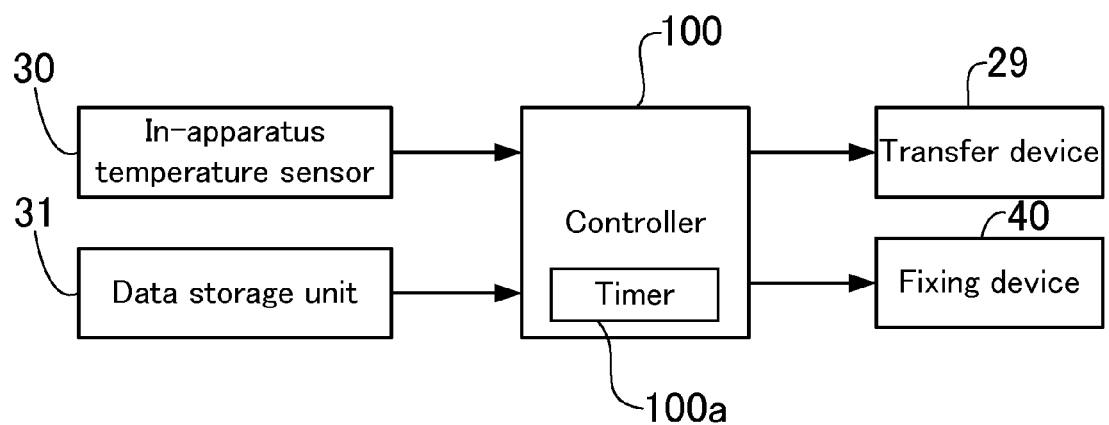
FIG. 3 is a schematic block diagram showing a part of a configuration of a control system of a laser printer.

In the present embodiment, on the basis of the measurement result shown in FIG. 2, a difference between the temperature detected by the in-apparatus temperature sensor 30 (see the thin line in FIG. 2) and the outside-air temperature (see the bold line in FIG. 2), in each of the normal mode and the sleep mode, is converted into a data form by using an elapsed time from a start time of each mode as a parameter, and previously stored in a data storage unit 31 (see FIG. 3). In the description that follows, the data stored in the data storage unit 31 is called correction data. When the data form is prepared, while 10 minutes lapses from a start time of the normal mode and while 10 minutes lapses from a start time of the sleep mode, for example, the temperature detected by the in-apparatus temperature sensor 30 may be linearly approximated to evaluate a difference between the temperature and the outside-air temperature after the approximation. As a result, it is possible to reduce an operation load for a temperature correction (which will be described later) in a time zone during which the detected temperature is rapidly changed.

The controller 100 includes a timer 100a used for clocking an elapsed time from a start time of each mode to a current time point. The controller 100 determines whether the mode at a current time point is either the normal mode or the sleep mode, and clocks, by the timer 100a, an elapsed time from a start time of the determined mode to the current time point. Further, the controller 100 corrects, on the basis of the determined mode and the elapsed time clocked by the timer 100a, the temperature (in-apparatus temperature) detected by the in-apparatus temperature sensor 30 on the basis of the correction data so that the corrected temperature is calculated as an outside-air temperature.

Specifically, in a time region where the elapsed time is 10 minutes or less, for example, from the mode start time in the normal mode, the controller 100 reads a correction value (correction value by the first approximation described above) in this time region from the correction data, and calculates, as the outside-air temperature, a temperature obtained by subtracting the correction value from the temperature detected by the in-apparatus temperature sensor 30. In a time region where the elapsed time exceeds 10 minutes and is equal to or less than 20 minutes, for example, from the mode start time in the normal mode, the controller 100 reads a correction value (for example, 15° C.) in this time region from the correction data, and calculates, as the outside-air temperature, a temperature obtained by subtracting the correction value 15° C. from the temperature detected by the in-apparatus temperature sensor 30.

Likewise, in a time region where the elapsed time from the mode start time in the sleep mode is equal to or less than 10 minutes, for example, the controller 100 reads a correction value (correction value by the first approximation described above) in this time region from the correction data, and calculates, as the outside-air temperature, a temperature obtained by subtracting the correction value from the temperature detected by the in-apparatus temperature sensor 30. In a time region where the elapsed time from the mode start time in the sleep mode exceeds 10 minutes and is equal to or less than 20 minutes, for example, the controller 100 reads a correction value (for example, 6° C.) in this time region from the correction data, and calculates, as the outside-air temperature, a temperature obtained by subtracting the correction value 6° C. from the temperature detected by the in-apparatus temperature sensor 30. In a time region where the elapsed time exceeds 20 minutes, the controller 100 reads a correction value (for example, 5° C.) in this time region from the correction data, and calculates, as the outside-air temperature, a temperature obtained by subtracting the correction value 5° C. from the temperature detected by the in-apparatus temperature sensor 30.

The controller 100 sequentially overwrites the calculated outside-air temperature with the outside-air temperature subsequently calculated, and saves the overwritten temperature into a memory. The controller 100 controls, on the basis of the latest outside-air temperature saved in the memory, a setting value of a transfer current of the transfer device 29 and a setting temperature of the fixing roller 40*a*, and thereby improves the image quality of a printed image.

Further, when the OFF state of the main power source is long, the in-apparatus temperature and the out-apparatus temperature become substantially the same, and thus, it is possible to calculate, as the outside-air temperature, the in-apparatus temperature detected by the in-apparatus temperature sensor 30 immediately after the main power source is turned on. However, the printer 1 having a sleep mode where power supply is interrupted to a part of the devices in a state where the main power source is turned on experiences a significant decrease in frequency of turning the main power source off unlike the printer 1 not having the sleep mode. As a result, the outside-air temperature calculated on the basis of the temperature detected by the in-apparatus temperature sensor 30 is not updated over a long duration, and it may not be possible to accurately calculate the outside-air temperature at the current time point. On the other hand, in the first embodiment, on the basis of the elapsed time from a start time of the mode at a current time point, the controller 100 is configured to calculate the outside-air temperature by correcting the temperature detected by the in-apparatus temperature sensor 30 with the correction data. Therefore, it is possible to accurately calculate the outside-air temperature at the current time point while updating it with a lapse of time.

Further, the correction data is obtained by converting, in each of the normal mode or the sleep mode, a difference between the temperature detected by the in-apparatus temperature sensor 30 and the outside-air temperature into a data form where the elapsed time from the start time of each of the modes acts as a parameter. Therefore, it is possible to perform an operation for the temperature correction in the controller 100 with a simple subtraction. Thus, it is possible to reduce an operation load in the controller 100.

Second Embodiment

Figure 4:
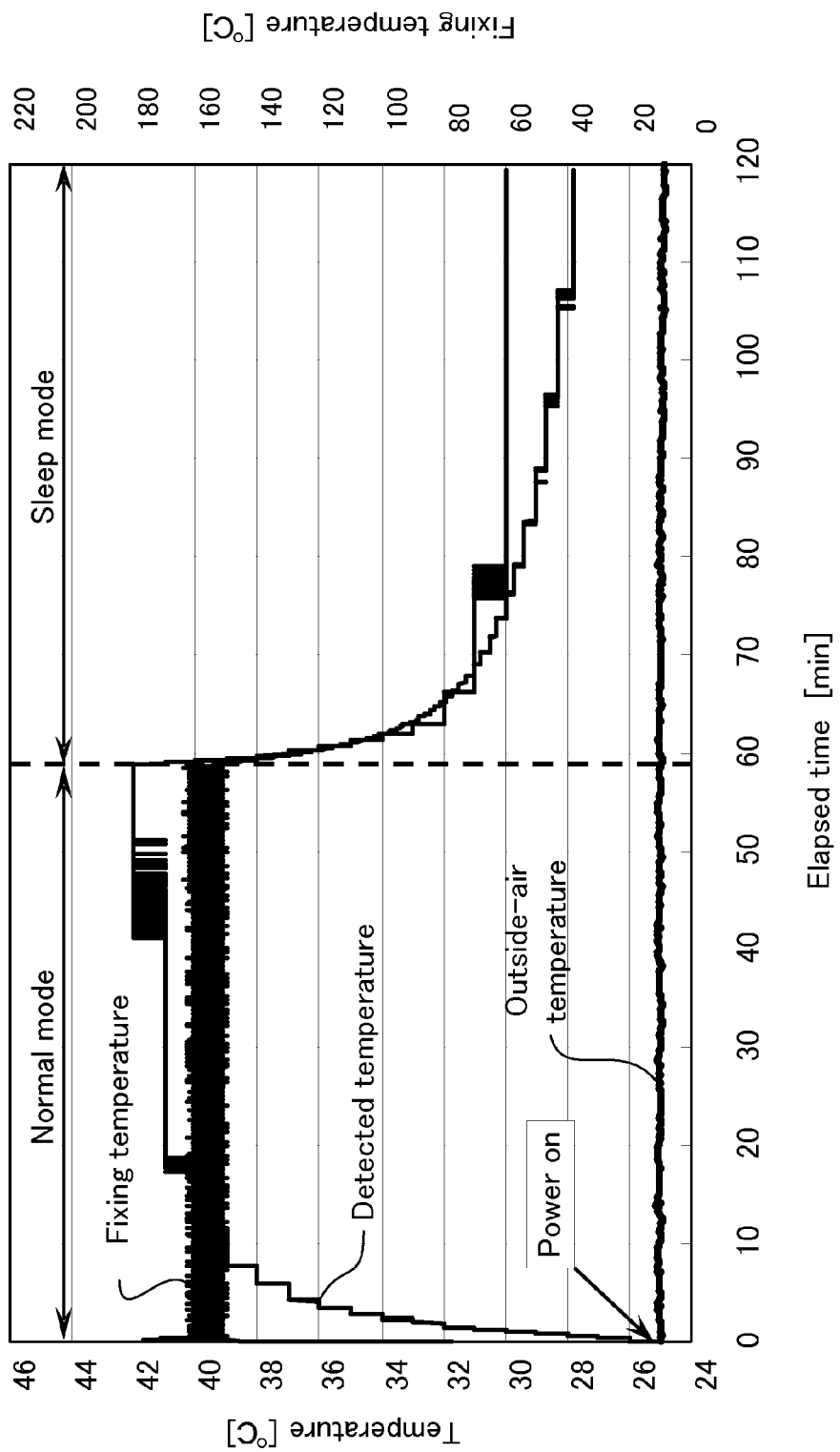
FIG. 4 is a diagram showing a second embodiment, which corresponds to FIG. 2.
Figure 5:
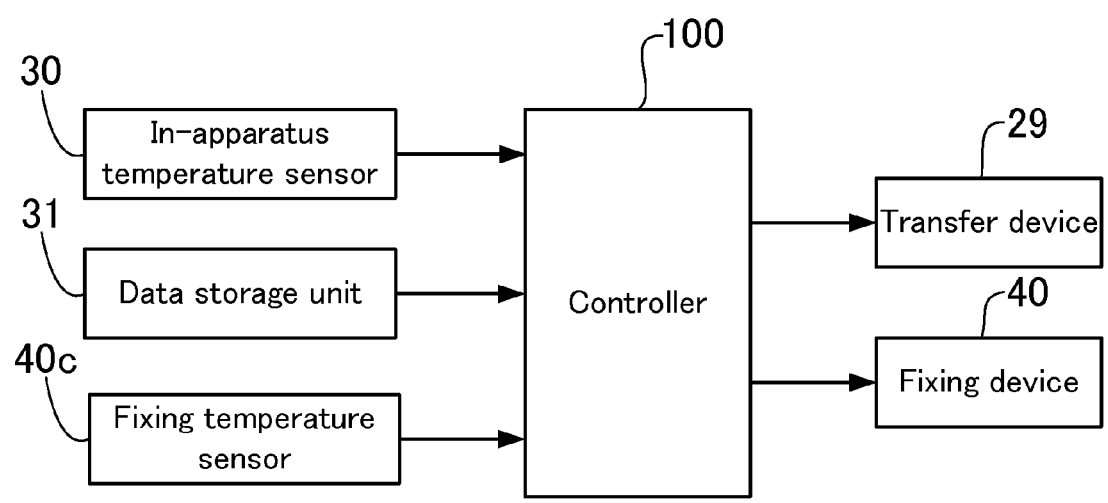
FIG. 5 is a diagram showing a second embodiment, which corresponds to FIG. 3.

FIG. 4 and FIG. 5 show a second embodiment. This embodiment differs from the first embodiment in that it is determined, by using the fixing temperature sensor 40*c*, whether a predetermined time lapses from a start time of the sleep mode, and on the basis of the correction data when it is determined that the predetermined time has lapsed, the temperature detected by the in-apparatus temperature sensor 30 is corrected to calculate the outside-air temperature. It should be noted that the configuration of hardware is in much the same way as that in the first embodiment except for a feature that the controller 100 (see FIG. 5) does not include the timer 100*a*.

FIG. 4 is a graph showing measurement results of the temperatures detected by the fixing temperature sensor 40 and the in-apparatus temperature sensor 30. In the normal mode, the temperature detected by the fixing temperature sensor 40 is kept at a constant value, that is, substantially 160° C. On the other hand, when the normal mode is transitioned to the sleep mode, no power is supplied from the main power source to the fixing device 40 that is a part of the image forming unit 20. Thus, the temperature detected by the fixing temperature sensor 40 decreases with a lapse of time.

On the other hand, as described in the first embodiment, the temperature detected by the in-apparatus temperature sensor 30 rapidly falls due to the lowering of an amount of heat to be generated by a CPU inside the controller 100 when the operation mode of the printer 1 is switched to the sleep mode. Then, when 20 minutes (predetermined time) lapses from a start time of the sleep mode, the lowering of the temperature detected by the in-apparatus temperature sensor 30 stops, and thereafter, the detected temperature becomes constant. A timing at which the lowering of the detected temperature stops substantially matches a timing at which the temperature detected by the fixing temperature sensor 40 reaches 60° C.

In the present embodiment, on the basis of the measurement results shown in FIG. 4, a difference between the temperature detected by the in-apparatus temperature sensor 30 after a predetermined time lapses from a start time of the sleep mode and the outside-air temperature is converted into a data form where an elapsed time acts as a parameter and is used as the correction data. The correction data is stored in the data storage unit 31, in much the same way as in the first embodiment. In this case, the predetermined time is a time from the start time of the sleep mode to when the temperature detected by the in-apparatus temperature sensor 30 stops to decrease. In the present embodiment, the predetermined time is set to 20 minutes.

When it is determined that the operation mode at the current time point is the sleep mode, if the temperature of the fixing roller 40*a* detected by the fixing temperature sensor 40 after the sleep mode is started decreases to reach a predetermined temperature (in the present embodiment, 60° C.), the controller 100 estimates that the elapsed time from the start time of the sleep mode to the current time point reaches the predetermined time.

After estimating that the elapsed time from the start time of the sleep mode to the current time point reaches the predetermined time, the controller 100 corrects the in-apparatus temperature detected by the in-apparatus temperature sensor 30 on the basis of the correction data so that the corrected temperature is calculated as the outside-air temperature.

Specifically, when the temperature detected by the fixing temperature sensor 40 is equal to or less than 60° C., the controller 100 reads the correction value (for example, 5° C.) from the correction data, and subtracts the correction value 5° C. from the temperature detected by the in-apparatus temperature sensor 30 so that the corrected temperature is calculated as the outside-air temperature. The controller 100 saves the calculated outside-air temperature into a non-volatile memory.

In the second embodiment, in a state where the in-apparatus temperature becomes stable (becomes constant) after a predetermined time lapses from the start time point of the sleep mode, the outside-air temperature is calculated by the controller 100. Thus, as compare to a case where the outside-air temperature is calculated in a state where variation in in-apparatus temperature is large (for example, a state immediately after a start of the normal mode or a state immediately after a start of the sleep mode), it is possible to improve the accuracy for calculating the outside-air temperature.

In addition, the second embodiment does not require the timer 100*a* unlike the first embodiment, and thus, it is possible to reduce a cost and it is also possible to reduce an operation load in the controller 100.

Further, in the second embodiment, the correction data is obtained by converting, in the sleep mode, a difference between the temperature detected by the in-apparatus temperature sensor after the predetermined time lapses from the start time and the outside-air temperature, into a data form. Therefore, it is possible to reduce the size of the correction data than that in the first embodiment. By extension, it is possible to reduce a memory capacity of the data storage unit 31 to achieve a reduction in cost.

Other Embodiments

In the second embodiment, the temperature detected by the in-apparatus temperature sensor 30 when the main power source is turned on may be stored, as the outside-air temperature, in a non-volatile memory. Thereafter, when the temperature detected by the fixing temperature sensor 40 becomes equal to or less than 60° C., the outside-air temperature may be calculated by the controller 100 and the outside-air temperature already stored in the non-volatile memory may be overwritten (updated) with the calculated outside-air temperature.

In each of the embodiments, the image forming apparatus is the laser printer 1; however this is not limiting, and the image forming apparatus may be another image forming apparatus such as a copier, a scanner, or a multifunction peripheral. Further, the image forming apparatus may not only be of electrophotographic type but also be of ink jet type.

As described above, the technology of the present disclosure is useful for an image forming apparatus, and in particular, useful for an image forming apparatus having a normal mode and a sleep mode.

What is claimed is:

1. An image forming apparatus, comprising:
    an apparatus body including an image forming unit that forms an image on a recording paper;
    an in-apparatus temperature sensor that detects an in-apparatus temperature that is a temperature inside the apparatus body; and
    an outside-air-temperature calculation unit that calculates an outside-air temperature that is a temperature outside the apparatus body on the basis of the in-apparatus temperature detected by the in-apparatus temperature sensor, wherein
    the image forming apparatus is configured to switch an operation mode between a normal mode and a sleep mode in which the power is less consumed than in the normal mode,
    the image forming apparatus further comprises: a storage unit that stores therein data on a difference between the in-apparatus temperature detected by the in-apparatus temperature sensor and the outside-air temperature;
    a mode determination unit that determines whether a mode at a current time point is either the normal mode or the sleep mode; and
    a clocking unit that clocks or estimates an elapsed time from a start time of the mode determined by the mode determination unit to a current time point, and
    the outside-air-temperature calculation unit is configured to correct, on the basis of the mode at a current time point determined by the mode determination unit and the elapsed time from a start time of the mode clocked by the clocking unit to a current time point, the in-apparatus temperature detected by the in-apparatus temperature sensor on the basis of the data so that the corrected temperature is calculated as the outside-air temperature.

2. The image forming apparatus according to claim 1, wherein
    the data is obtained by converting, in each of the normal mode or the sleep mode, a difference between the temperature detected by the in-apparatus temperature sensor and the outside-air temperature, into a data form where the elapsed time from the start time of each of the modes acts as a parameter.

3. The image forming apparatus according to claim 1, wherein
    the image forming unit includes: an image carrier; a transfer roller that transfers a toner image carried by the image carrier to the recording paper; and
    a fixing roller that fixes the toner image transferred to the recording paper onto the recording paper, and further includes
    a fixing temperature sensor that detects a temperature of the fixing roller,
    when the mode determination unit determines that a mode at a current time point is the sleep mode, if a temperature of the fixing roller detected by the fixing temperature sensor, after the sleep mode is started, decreases to reach a predetermined temperature, the clocking unit is configured to estimate that an elapsed time from the start time of the sleep mode to the current time point reaches a predetermined time, and
    when the mode determination unit determines that a mode at a current time point is the sleep mode, after the clocking unit estimates that an elapsed time from the start time of the sleep mode to the current time point reaches the predetermined time, the outside-air-temperature calculation unit is configured to correct the in-apparatus temperature detected by the in-apparatus temperature sensor on the basis of the data so that the corrected temperature is calculated as the outside-air temperature.

4. The image forming apparatus according to claim 3, wherein
    the data is obtained by converting, in the sleep mode, a difference between the temperature detected by the in-apparatus temperature sensor after the predetermined time lapses from a start time of the sleep mode and the outside-air temperature into a data format where the elapsed time acts as a parameter.

* * * * *